United States Patent
Saito

(10) Patent No.: US 10,746,296 B2
(45) Date of Patent: Aug. 18, 2020

(54) SHIFT DEVICE OF TRANSMISSION

(71) Applicant: SUZUKI MOTOR CORPORATION, Hamamatsu-shi, Shizuoka (JP)

(72) Inventor: Naoki Saito, Hamamatsu (JP)

(73) Assignee: SUZUKI MOTOR CORPORATION, Hamamatsu-Shi, Shizuoka (JP)

(*) Notice: Subject to any disclaimer, the term of this patent is extended or adjusted under 35 U.S.C. 154(b) by 0 days.

(21) Appl. No.: 16/175,432

(22) Filed: Oct. 30, 2018

(65) Prior Publication Data
US 2019/0128416 A1    May 2, 2019

(30) Foreign Application Priority Data

Nov. 2, 2017 (JP) .................. 2017-213069

(51) Int. Cl.
| F16H 63/18 | (2006.01) |
| F16H 59/68 | (2006.01) |
| F16H 59/04 | (2006.01) |
| F16H 59/02 | (2006.01) |

(52) U.S. Cl.
CPC .......... *F16H 63/18* (2013.01); *B60Y 2200/12* (2013.01); *F16H 59/042* (2013.01); *F16H 59/68* (2013.01); *F16H 2059/0234* (2013.01)

(58) Field of Classification Search
CPC . F16H 2059/0234; F16H 59/042; F16H 63/18
See application file for complete search history.

(56) References Cited

U.S. PATENT DOCUMENTS

| 7,568,403 | B2* | 8/2009 | Matsuda |
| 2014/0290405 | A1* | 10/2014 | Sugano |
| 2016/0091089 | A1 | 3/2016 | Nakamura et al. ............. 3/91 |
| 2017/0067542 | A1* | 3/2017 | Takahashi |

FOREIGN PATENT DOCUMENTS

JP    2016-70357 A    5/2016

* cited by examiner

Primary Examiner — Randell J Krug
(74) Attorney, Agent, or Firm — Stein IP, LLC

(57) ABSTRACT

A shift device of a transmission includes: a cylindrical or columnar shift cam that is formed, at an outer circumferential surface of the shift cam, with a cam groove for operating a shift fork; a drive plate that oscillates by rotation of a shift pedal shaft; a shift cam plate that is fixed to one end portion of the shift cam and rotates the shift cam according to the oscillation of the drive plate; a shift cam sensor that detects a rotation angle of the shift cam; and a transmission shaft that transmits the rotation of the shift cam to the shift cam sensor, as defined herein.

3 Claims, 8 Drawing Sheets (1)

(2)

SHIFT DEVICE OF TRANSMISSION

CROSS-REFERENCE TO RELATED APPLICATIONS

This application claims the benefit of Japanese Patent Application JP 2017-213069, filed Nov. 2, 2017, the entire content of which is hereby incorporated by reference, the same as if set forth at length.

FIELD OF THE INVENTION

The present invention relates to a shift device of a transmission to be used in a vehicle such as a motorcycle.

BACKGROUND OF THE INVENTION

A transmission of a vehicle such as a motorcycle includes a main shaft and a drive shaft, each of which is provided with a plurality of gears. Further, the transmission includes a shift device that switches the gears according to a shift operation of a shift pedal.

The shift device includes a shift cam, a shift fork, or the like. The shift cam rotates according to the shift operation. A cam groove is formed at an outer circumferential surface of the shift cam, and a part of the shift fork is engaged with the cam groove. When the shift cam rotates, the cam groove causes the shift fork to move along the main shaft or the drive shaft. Due to the movement of the shift fork, a specific gear of the plurality of gears provided on the main shaft or the drive shaft slides. Accordingly, among the plurality of gears supported by the main shaft and the drive shaft, a combination of gears for transmitting rotation of the main shaft to the drive shaft is switched, and thus a gear ratio changes.

Such a shift device includes an angle sensor that detects a rotation angle of the shift cam. For example, a transmission described in JP-A-2016-70357 below includes a main shaft in which a plurality of driving gears are supported, a counter shaft in which a plurality of driven gears meshing with the plurality of driving gears are supported, a shift fork that is engaged with a shifter gear including the driving gears and the driven gears, a shift drum in which a lead groove is formed at an outer circumferential surface and one end of the shift fork is engaged with the lead groove, a sensor shaft that is provided on the shift drum and rotates integrally with the shift drum, and an angle sensor that detects a rotation angle of the sensor shaft. Incidentally, the shift drum has the same function as the shift cam.

In the transmission of JP-A-2016-70357, the sensor shaft and the shift drum are disposed coaxially, and an end portion of the sensor shaft is fixed to an end portion of the shift drum with a nut. Accordingly, the sensor shaft rotates integrally with the shift drum. The angle sensor is a potentiometer, and outputs a voltage based on the rotation angle of the sensor shaft.

SUMMARY OF THE INVENTION

In the transmission described in JP-A-2016-70357, a method of detecting the rotation angle of the sensor shaft coaxially connected to the shift drum with the angle sensor is adopted as a method of detecting a rotation angle of the shift drum. In this case, in order to improve detection accuracy of the rotation angle of the shift drum, it is necessary to determine a position of the sensor shaft in a rotation direction with respect to the shift drum with high accuracy, and it is necessary to firmly fix the sensor shaft to the shift drum such that a position of the sensor shaft does not displace in the rotation direction with respect to the shift drum.

FIG. 7 of JP-A-2016-70357 describes a structure in which the sensor shaft is stopped by a nut at the end portion of the shift drum. When the sensor shaft is only stopped by a nut, the position of the sensor shaft may displace in the rotation direction with respect to the shift drum. In such a structure, a pin or a key is generally used to stop a portion on an outer circumferential side of the sensor shaft to the shift drum and to suppress position displacement of the sensor shaft in the rotation direction with respect to the shift drum.

However, even when a pin or a key is used to fix the sensor shaft to the shift drum, position variation or displacement of the sensor shaft with respect to the shift drum may occur due to a tolerance of a pin, a key or the like. Further, using the pin or the key to fix the sensor shaft to the shift drum increases the number of parts of the transmission.

The present invention has been made in view of the matter as described above, for example, and the present invention provides a shift device capable of improving detection accuracy of a rotation angle of a shift cam and reducing the number of parts.

The present invention provides a shift device of a transmission, the shift device including: a cylindrical or columnar shift cam that is formed with a cam groove for operating a shift fork at an outer circumferential surface of the shift cam; a drive plate that oscillates by rotation of a shift pedal shaft; a shift cam plate that is fixed to one end portion of the shift cam and rotates the shift cam according to the oscillation of the drive plate; a shift cam sensor that detects a rotation angle of the shift cam; and a transmission shaft that transmits the rotation of the shift cam to the shift cam sensor, in which an insertion hole is formed in a position corresponding to a rotation axis of the shift cam at the one end portion of the shift cam, a through hole penetrating the shift cam plate is formed in the shift cam plate, the transmission shaft is disposed coaxially with the shift cam, one end portion of the transmission shaft is connected to or opposed to the shift cam sensor, and the other end portion of the transmission shaft penetrates the through hole and is fixed to the shift cam in a state of being press-fitted into the insertion hole.

According to the present invention, the detection accuracy of the rotation angle of the shift cam can be improved, and the number of parts of the shift device can be reduced.

Figure 1:
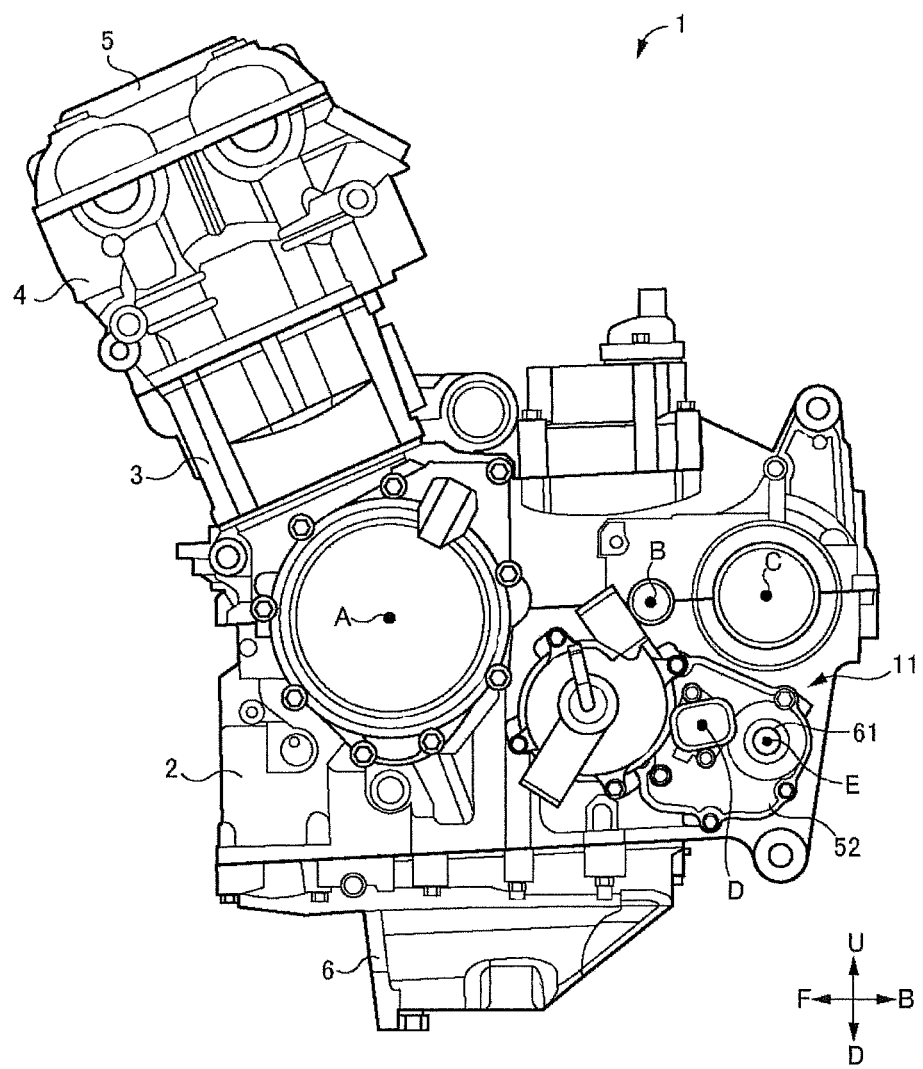
FIG. 1 is an external view showing an engine equipped with a transmission including a shift device according to an embodiment of the present invention.

DESCRIPTION OF REFERENCE NUMERALS 1 engine
11 shift device
12 shift cam
13 cam groove
14 small-diameter portion
16 insertion hole
18 support portion
20 left bearing
23 shift fork
27 shift cam plate
30 through hole
33 circular recessed portion
39 transmission shaft
43 drive plate
48 shift cam sensor
61 shift pedal shaft

DETAILED DESCRIPTION OF THE INVENTION

A shift device according to an embodiment of the present invention includes a cylindrical or columnar shift cam that is formed with a cam groove for operating a shift fork at an outer circumferential surface of the shift cam, a drive plate that oscillates by rotation of a shift pedal shaft, a shift cam plate that is fixed to one end portion of the shift cam and rotates the shift cam according to the oscillation of the drive plate, a shift cam sensor that detects a rotation angle of the shift cam, and a transmission shaft that transmits the rotation of the shift cam to the shift cam sensor.

Further, an insertion hole is formed in a position corresponding to a rotation axis of the shift cam at the one end portion of the shift cam. A through hole penetrating the shift cam plate is formed in the shift cam plate. The transmission shaft is disposed coaxially with the shift cam, and one end portion of the transmission shaft is connected to or opposed to the shift cam sensor. The other end portion of the transmission shaft penetrates the through hole of the shift cam plate and is fixed to the shift cam in a state of being press-fitted into the insertion hole of the shift cam.

According to the shift device of the embodiment of the present invention, by press-fitting the other end portion of the transmission shaft into the insertion hole formed in the one end portion of the shift cam, a position of the transmission shaft with respect to the shift cam in a circumferential direction can be determined with high accuracy, and the transmission shaft can be firmly fixed to the shift cam such that the position of the transmission shaft does not displace with respect to the shift cam in the circumferential direction. Therefore, the detection accuracy of the rotation angle of the shift cam can be improved.

Further, since a pin or a key is not used for positioning the transmission shaft with respect to the shift cam in the circumferential direction, it is possible to eliminate position variation or displacement of the transmission shaft with respect to the shift cam due to a tolerance of a hole or a groove into which the pin or the key is inserted. Further, since the pin or the key is not used, the number of parts of the shift device can be reduced.

FIG. 1 is an external view of an engine 1 equipped with a transmission including a shift device 11 according to an embodiment of the present invention viewed from a left side thereof. The engine 1 is an engine used in, for example, a motorcycle. In this embodiment, in a case of showing a direction when describing a shape, arrangement, and operation of a device, a part, a member, and the like, a driver seated in a driver seat of a motorcycle equipped with the engine 1 is used as a reference. Lower right arrows in the drawings respectively indicate upper (U), lower (down) (D), left (L), right (R), front (F), and rear (back) (B) with the driver as a reference.

The engine 1 includes a crankcase 2, a cylinder 3 provided on a front portion of the crankcase 2, a cylinder head 4 provided over the cylinder 3, a head cover 5 covering an upper portion of the cylinder head 4, and an oil pan 6 provided below the crankcase 2. A crankshaft is provided on an inner front side of the crankcase 2. The crankshaft extends in a left-right direction. A in FIG. 1 indicates an axial center of the crankshaft. A piston is provided inside the cylinder 3, and the piston is connected to the crankshaft via a connecting rod. The cylinder head 4 is provided with an intake port and an exhaust port. An intake valve, an exhaust valve, and a valve mechanism are provided inside the cylinder head 4, and an ignition plug is attached to the cylinder head 4.

A constant-mesh transmission is provided on an inner rear side of the crankcase 2. The transmission includes a main shaft and a drive shaft, each of which is provided with a plurality of gears, and the shift device 11 according to the embodiment of the present invention. The main shaft and the drive shaft extend in parallel with the crankshaft separately. B in FIG. 1 indicates an axial center of the main shaft. In addition, C in FIG. 1 indicates an axial center of the drive shaft. A later-described shift cam 12 included in the shift device 11 also extends in parallel with the crankshaft. D in FIG. 1 indicates an axial center of the shift cam 12 included in the shift device 11.

Rotation of the crankshaft is transmitted to the main shaft via a primary drive gear fixed to the crankshaft and a primary driven gear fixed to the main shaft. In the transmission, rotation of the main shaft is transmitted to the drive shaft by the plurality of gears respectively provided on the main shaft and the drive shaft. The shift device 11 switches a combination of gears that transmits the rotation of the main shaft to the drive shaft among the plurality of gears respectively provided on the main shaft and the drive shaft. This changes a gear ratio. Further, the rotation of the drive shaft is transmitted to a drive wheel of a motorcycle via a drive chain.

A shift pedal shaft 61 is provided on a rear lower side of a left side of the engine 1. The shift pedal shaft 61 extends in the left-right direction and is rotatably supported by the crankcase 2 and a side cover 52. A shift pedal for a driver to perform shift operation with a left foot is attached to a tip end side of the shift pedal shaft 61. E in FIG. 1 indicates an axial center of the shift pedal shaft 61.

Figure 2:
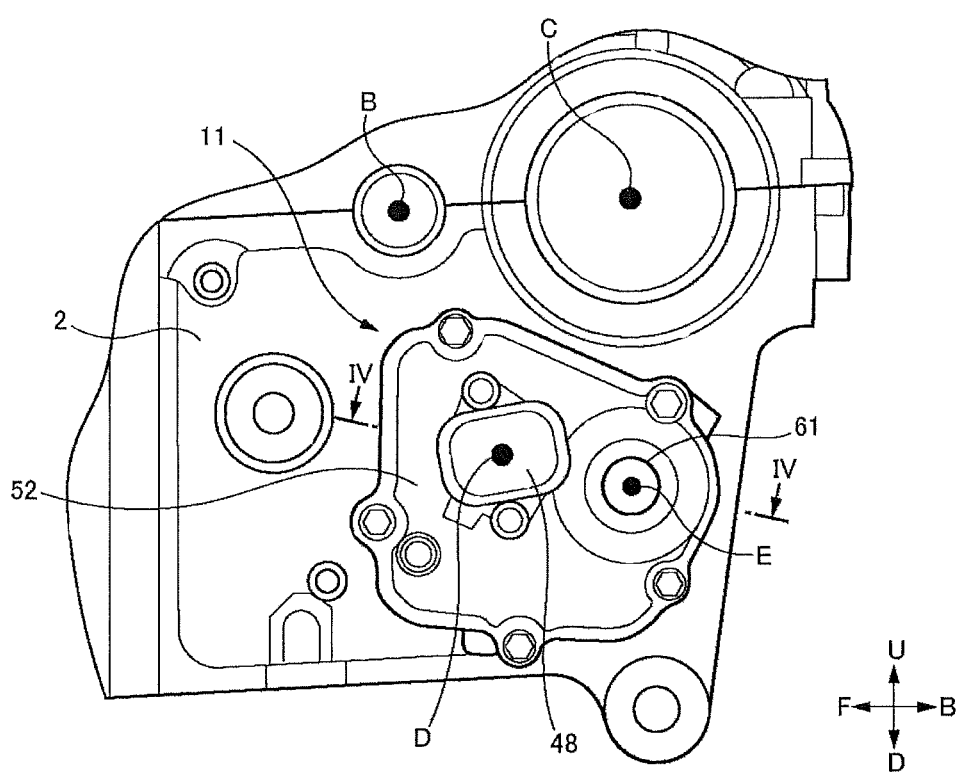
FIG. 2 is an external view showing a portion where a side cover of the shift device is provided in the engine in FIG. 1.
Figure 3:
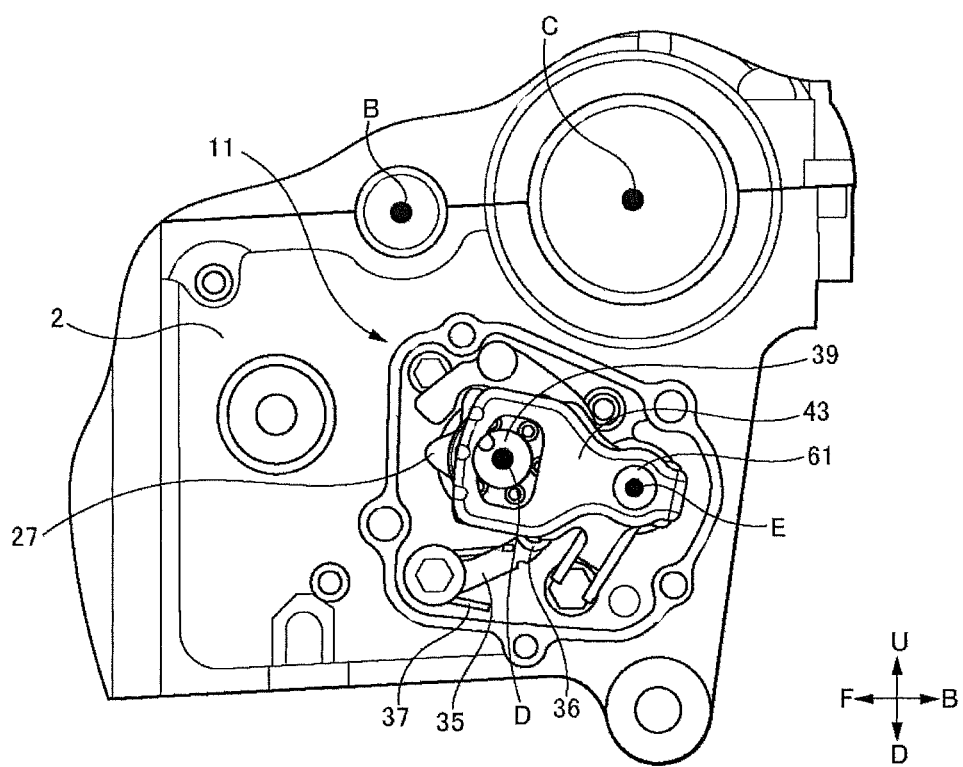
FIG. 3 is an explanatory view showing a state where a shift cam sensor and the side cover of the shift device in FIG. 2 are removed.
Figure 4:
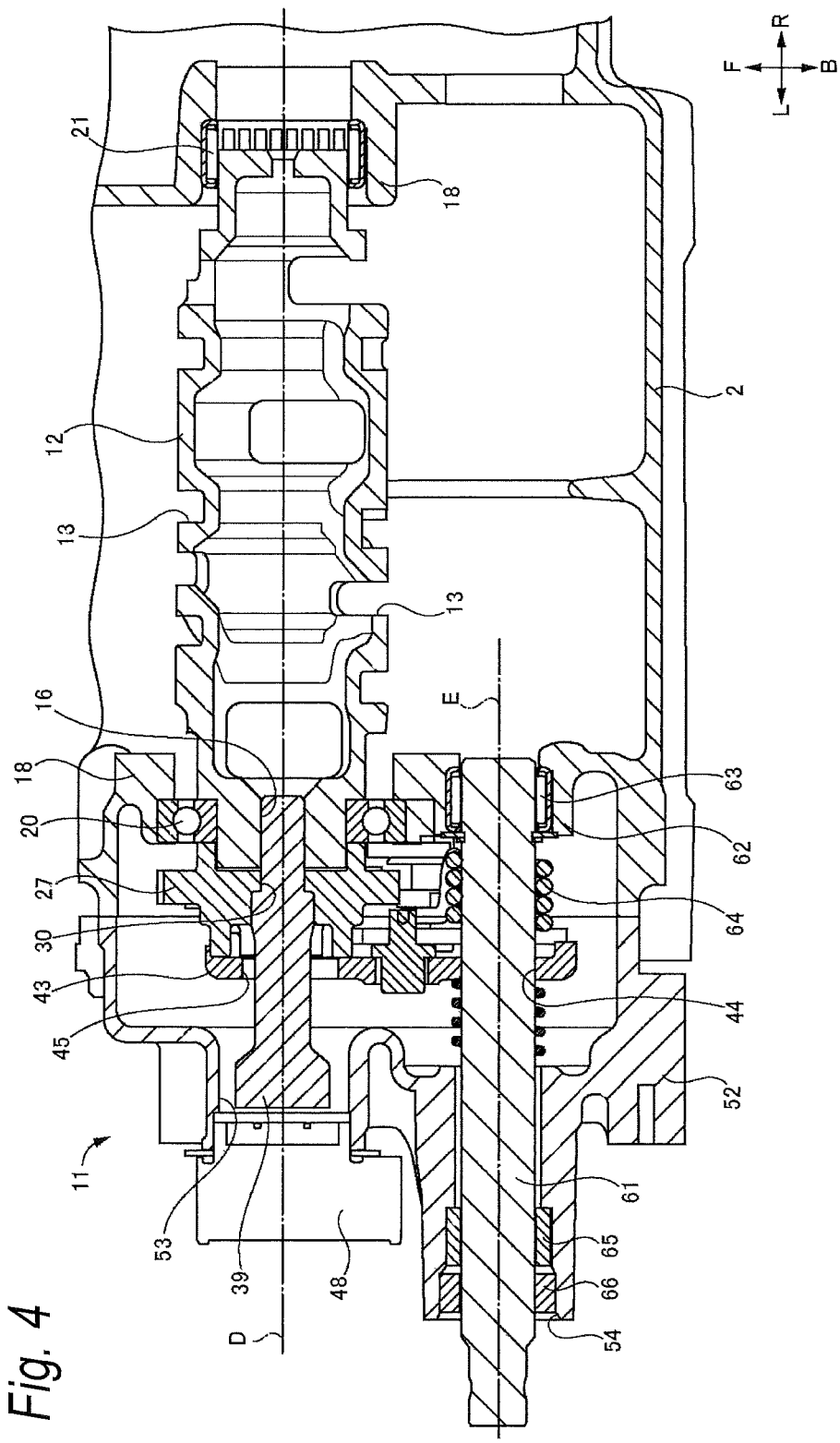
FIG. 4 is a sectional view showing a rear portion of a crankcase and the shift device viewed from a direction of an arrow IV-IV in FIG. 2.
Figure 5:
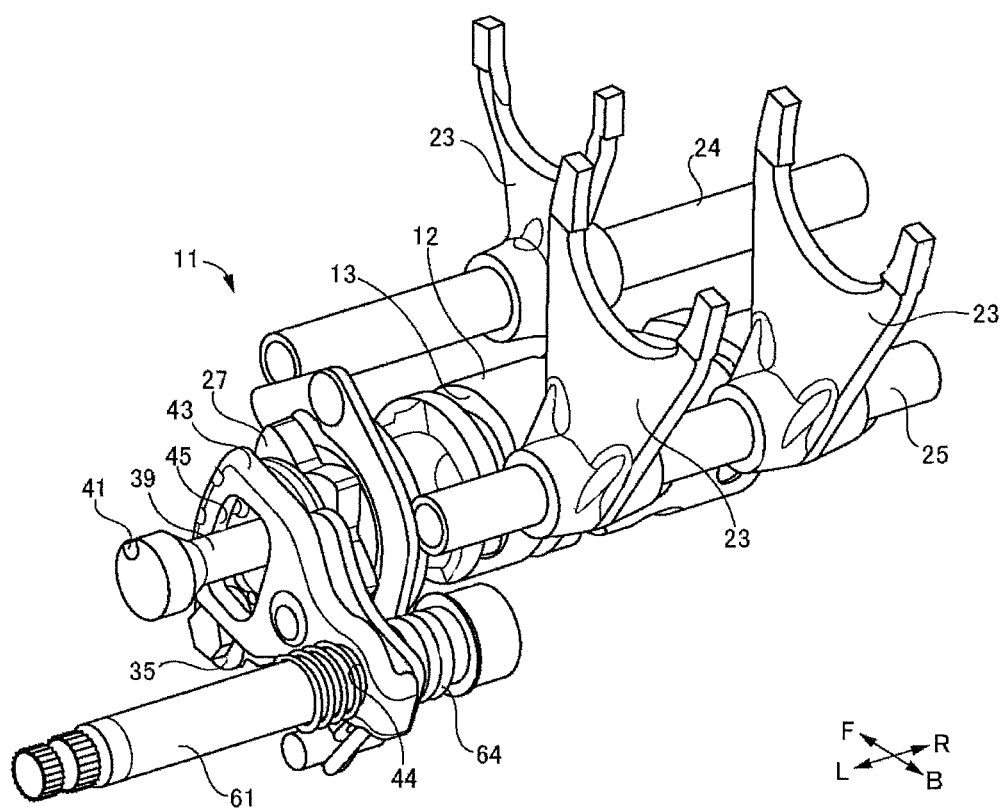
FIG. 5 is a perspective view showing the shift device (excluding the shift cam sensor) according to the embodiment of the present invention.
Figure 6:
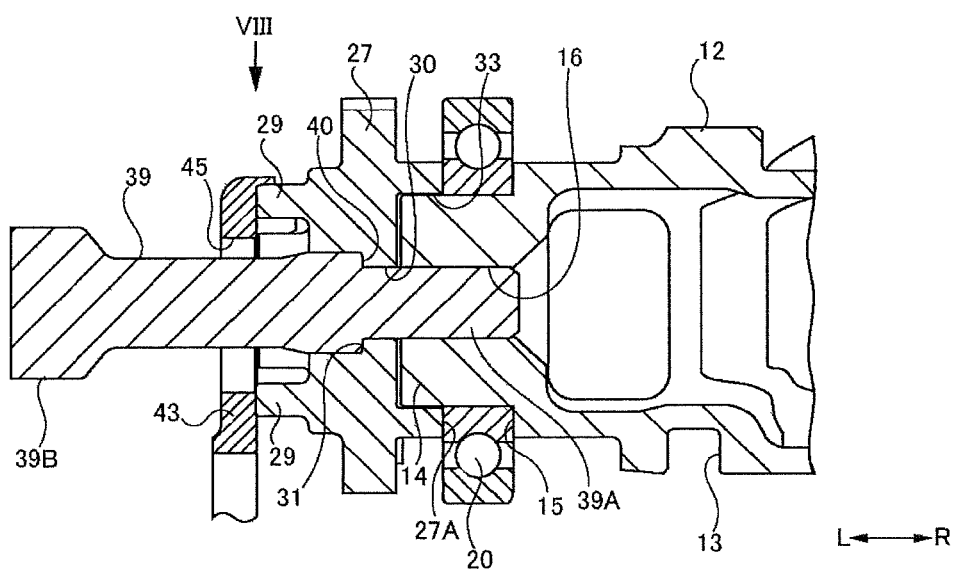
FIG. 6 is a sectional view showing a shift cam, a shift cam plate, a transmission shaft, and the like in the shift device according to the embodiment of the present invention.

FIG. 2 shows an enlarged view of a portion where the side cover 52 of the shift device 11 is provided in the engine 1 in FIG. 1. FIG. 3 shows a state where a shift cam sensor 48 and the side cover 52 of the shift device 11 in FIG. 2 are removed. FIG. 4 shows a cross section of a rear portion of a crankcase 2 and the shift device 11 viewed from a direction of an arrow IV-IV in FIG. 2. FIG. 5 shows a portion of the shift device 11 excluding the shift cam sensor 48. FIG. 6 shows a cross section of the shift cam 12, a shift cam plate 27, a transmission shaft 39, and the like in the shift device 11. A cutting position in FIG. 6 is the same as a cutting position in FIG. 4.

As shown in FIG. 5, the shift device 11 includes the shift cam 12, a plurality of shift forks 23, a plurality of fork shafts 24 and 25, the shift cam plate 27, a stopper arm 35, the transmission shaft 39, and a drive plate 43. Further, as shown in FIG. 4, the shift device 11 includes the shift cam sensor 48 and the side cover 52.

As shown in FIG. 5, the shift cam 12 is formed in a cylindrical shape using, for example, a metal material. A cam groove 13 for operating the shift forks 23 is formed at an outer circumferential surface of the shift cam 12. As shown in FIG. 4, the shift cam 12 is disposed on the inner rear side of the crankcase 2 and extends in the left-right direction. The shift cam 12 is disposed below the main shaft and the drive shaft. Both end portions of the shift cam 12 are rotatably supported by support portions 18 formed at two places of the crankcase 2 via a left bearing 20 and a right bearing 21. Accordingly, the shift cam 12 can rotate around the axial center D.

As shown in FIG. 6, a left end portion of the shift cam 12 is formed with a small-diameter portion 14 having a diameter smaller than that of an intermediate portion of the shift cam 12 in the left-right direction. A step portion 15 is formed between the intermediate portion of the shift cam 12 in the left-right direction and the small-diameter portion 14. An inner ring of the left bearing 20 and the shift cam plate 27 are attached to the small-diameter portion 14.

At the left end portion of the shift cam 12, an insertion hole 16 is formed at a position corresponding to the axial center D (rotation axis) of the shift cam 12, specifically, at a center of a left end surface of the shift cam 12. The insertion hole 16 extends rightwards from the left end surface of the shift cam 12 to a position over the step portion 15. The insertion hole 16 in this embodiment penetrates the left end portion of the shift cam 12. The transmission shaft 39 is press-fitted into the insertion hole 16.

The shift forks 23 shown in FIG. 5 are members that slide a slide gear provided on each of the main shaft and the drive shaft. That is, a plurality of gears provided on the main shaft each include a slide gear that can rotate integrally with the main shaft and can slide in an axial direction of the main shaft. A plurality of gears provided on the drive gear each include a slide gear that can rotate integrally with the drive shaft and can slide in an axial direction of the drive shaft. The shift forks 23 switch a combination of gears that transmit the rotation of the main shaft to the drive shaft by sliding the slide gears.

As shown in FIG. 5, the shift device 11 includes three shift forks 23. One of the three shift forks 23 is a shift fork that slides a slide gear provided on the main shaft, and is slidably supported by the front fork shaft 24 in an axial direction thereof. The remaining two shift forks 23 are shift forks that slide two slide gears each provided on the drive shaft, and are slidably supported by the rear fork shaft 25 in an axial direction thereof. Although not shown, both end portions of each of the front fork shaft 24 and the rear fork shaft 25 are supported by the crankcase 2. A pin projecting toward the outer circumferential surface of the shift cam 12 is provided on a lower end side of each of the shift forks 23, and each pin is engaged with the cam groove 13 of the shift cam 12.

A portion of the shift fork 23 on an upper end side supported by the front fork shaft 24 is connected to the slide gear provided on the main shaft. Portions of the two shift forks 23 on an upper end side supported by the rear fork shaft 25 are connected to the two slide gears provided on the main shaft respectively. When the shift cam 12 rotates, each of the shift forks 23 slides according to the shape of the cam groove 13, and each of the slide gears slides as the sliding of each of the shift forks 23.

Figure 7:
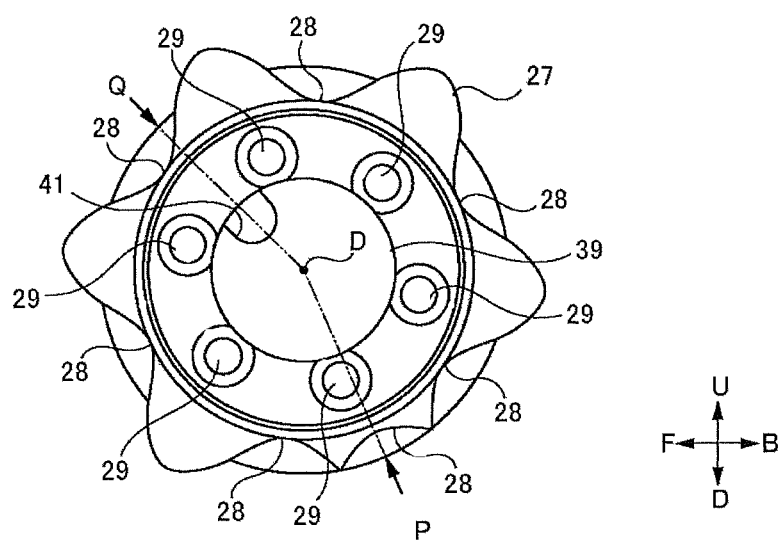
FIG. 7 is an explanatory view showing the shift cam plate and the transmission shaft in the shift device according to the embodiment of the present invention.

The shift cam plate 27 is a member that rotates the shift cam 12 according to oscillation of the drive plate 43. As shown in FIG. 4, the shift cam plate 27 is fixed to the left end portion of the shift cam 12. Here, FIG. 7 shows the shift cam plate 27 and the transmission shaft 39 viewed from the left side. As shown in FIG. 7, an outer circumferential surface of the shift cam plate 27 is formed with, for example, seven engagement recessed portions 28 with which the stopper arm 35 (see FIG. 3) is engaged. The transmission in this embodiment is, for example, a six-stage transmission. The six engagement recessed portions 28 formed at intervals of 60 degrees in a circumferential direction of the shift cam plate 27 correspond to respective stages of the six-stage transmission. An engagement recessed portion 28 formed between a pair of adjacent engagement recessed portions 28 among the six engagement recessed portions 28 corresponds to a neutral.

Further, a plurality of protrusions 29 that are engaged with a plurality of pawl portions 46 (see FIG. 8) of the drive plate 43 are formed on an outer edge side on the left end surface of the shift cam plate 27. For example, six protrusions 29 are formed on the shift cam plate 27 in this embodiment, and these protrusions 29 are disposed at intervals of 60 degrees. As shown in FIG. 6, each of the protrusions 29 protrudes to left from the left end surface of the shift cam plate 27.

As shown in FIG. 6, the shift cam plate 27 is formed with a through hole 30 that penetrates a central portion of the shift cam plate 27 in the left-right direction (that is, the axial direction). A right end side portion of the through hole 30 is smaller in diameter than a left end side portion thereof, and a step portion 31 is formed between the right end side portion and the left end side portion of the through hole 30. The transmission shaft 39 is inserted into the through hole 30.

A circular recessed portion 33 having a circular cross-sectional shape is formed on a right end surface 27A of the shift cam plate 27. The left end portion (small-diameter portion 14) of the shift cam 12 is inserted into and fixed to the circular recessed portion 33. Accordingly, the shift cam plate 27 and the shift cam 12 are integrated, and both of them rotate together.

The stopper arm 35 shown in FIG. 3 has a function of stopping the shift cam plate 27 and the shift cam 12 at positions corresponding to the stages of the transmission by engaging with the engagement recessed portion 28 of the shift cam plate 27. A base end portion of the stopper arm 35 is rotatably supported by the crankcase 2. A tip end portion of the stopper arm 35 is rotatably provided with a roller 36. Further, the stopper arm 35 is urged by a spring 37 such that the tip end portion of the stopper arm 35 rotates counter-clockwise in FIG. 3, with the base end portion as a rotation axis. Accordingly, the roller 36 provided at the tip end portion of the stopper arm 35 is pressed against the engagement recessed portion 28 of the shift cam plate.

As shown in FIG. 4, the transmission shaft 39 is a member that transmits rotation of the shift cam 12 to the shift cam sensor 48. The transmission shaft 39 is formed in a rod shape using, for example, a metal material. The transmission shaft 39 is disposed coaxially with the shift cam 12. A right end side of the transmission shaft 39 passes an insertion hole 45 of the drive plate 43 and the through hole 30 of the shift cam plate 27, and thus is press-fitted into and fixed to the insertion hole 16 of the shift cam 12. The transmission shaft 39 is integrated with the shift cam 12 and the shift cam plate 27, and the transmission shaft 39 rotates together with the shift cam 12 and the shift cam plate 27.

As shown in FIG. 6, a right end portion 39A of the transmission shaft 39 is smaller in diameter than an intermediate portion of the transmission shaft 39 in the left-right direction, and a step portion 40 is formed between the right portion 39A of the transmission shaft 39 and the intermediate portion of the transmission shaft 39 in the left-right direction. The step portion 40 is in contact with the step portion 31 formed on the through hole 30 of the shift cam plate 27.

A left end portion 39B of the transmission shaft 39 is larger in diameter than the intermediate portion of the transmission shaft 39 in the left-right direction. As shown in FIG. 5, the left end portion 39B of the transmission shaft 39 is formed with an engagement groove 41 that is engaged with an engagement projection piece 51 (see FIG. 9) of the shift cam sensor 48. The engagement groove 41 is formed in a portion on an outer circumferential surface of the left end portion 39B from an outer edge of a left end surface of the transmission shaft 39.

Here, the transmission shaft 39, the shift cam plate 27, and the left bearing 20 are fixed to the left end portion of the shift cam 12 as follows. As shown in FIG. 6, the left bearing 20 is fitted to the small-diameter portion 14 formed on the left end portion of the shift cam 12. The small-diameter portion 14 and the inner ring of the left bearing 20 fit closely but are not in a state of being press-fitted. That is, an inner circumferential surface of the inner ring of the left bearing 20 and an outer circumferential surface of the small-diameter portion 14 are not pressed against each other.

A left end portion of the small-diameter portion 14 of the shift cam 12 is press-fitted into the circular recessed portion 33 formed on the right end surface 27A of the shift cam plate 27. That is, in a state where the left end portion of the small-diameter portion 14 is inserted into the circular recessed portion 33, an inner circumferential surface of the circular recessed portion 33 of the shift cam plate 27 and an outer circumferential surface of the left end portion of the small-diameter portion 14 of the shift cam 12 are pressed against each other. Accordingly, the shift cam plate 27 is fixed to the left end portion of the small-diameter portion 14 of the shift cam 12 immovably in the axial direction and in the circumferential direction.

In a state where the small-diameter portion 14 of the shift cam 12 is press-fitted into the circular recessed portion 33 of the shift cam plate 27, the inner ring of the left bearing 20 is disposed between the right end surface 27A (an end surface of the edge of the circular recessed portion 33) of the shift cam plate 27 and the step portion 15 of the shift cam 12. In this state, a left end surface of the inner ring of the left bearing 20 is pressed rightwards to the right end surface 27A of the shift cam plate 27, and a right end surface of the inner ring of the left bearing 20 is pressed leftwards to the step portion 15 of the shift cam 12. Accordingly, the inner ring of the left bearing 20 is fixed to the small-diameter portion 14 of the shift cam 12.

The right end side of the transmission shaft 39 penetrates the insertion hole 45 of the drive plate 43. An inner diameter of the insertion hole 45 of the drive plate 43 is larger than a diameter of any portion of the transmission shaft 39. The transmission shaft 39 penetrates the insertion hole 45 of the drive plate 43 through a large gap.

The right end side of the transmission shaft 39 penetrates the through hole 30 of the shift cam plate 27. The right end side of the transmission shaft 39 penetrates the through hole 30 in a state of fitting closely to the through hole 30 of the shift cam plate 27, but is not in a state of being press-fitted. That is, an outer circumferential surface on the right end side of the transmission shaft 39 and an inner circumferential surface of the through hole 30 of the shift cam plate 27 are not pressed against each other on the right side or the left side of the step portion 31 (step portion 40).

The right end portion 39A of the transmission shaft 39 is press-fitted into the insertion hole 16 formed in the left end surface of the shift cam 12. That is, in a state where the right end portion 39A of the transmission shaft 39 is inserted into the insertion hole 16, an outer circumferential surface of the right end portion 39A of the transmission shaft 39 and an inner circumferential surface of the insertion hole 16 of the shift cam 12 are pressed against each other. Accordingly, the transmission shaft 39 is fixed to the insertion hole 16 of the shift cam 12 immovably in the axial direction and in the circumferential direction. In this state, the step portion 40 formed on the right end side of the transmission shaft 39 is in contact with the step portion 31 formed on the through hole 30 of the shift cam plate 27.

A tip end of the right end portion 39A of the transmission shaft 39 press-fitted into the insertion hole 16 of the shift cam 12 enters inside the left bearing 20 located on a right side of the shift cam plate 27. That is, as shown in FIG. 6, the tip end of the right end portion 39A of the transmission shaft 39 is over the right end surface 27A of the shift cam plate 27, is over the left end surface of the inner ring of the left bearing 20, and extends rightwards to the right end surface of the inner ring of the left bearing 20 (in the embodiment, the tip end of the right end portion 39A of the transmission shaft 39 extends rightwards over the right end surface of the inner ring of the left bearing 20). Since the right end portion 39A of the transmission shaft 39 is deeply press-fitted into the insertion hole 16 in this manner, the left end portion of the shift cam 12 is pressed outwards in a radial direction by the right end portion 39A of the transmission shaft 39, and the left end portion of the shift cam 12 is only expanded in the radial direction due to the pressing force. Accordingly, the outer circumferential surface of the left end portion (small-diameter portion 14) of the shift cam 12 and the inner circumferential surface of the inner ring of the left bearing 20 can be reliably brought into contact with each other.

As shown in FIG. 7, a position P of the shift cam plate 27 with respect to the shift cam 12 in the circumferential direction and a position Q of the transmission shaft 39 with respect to the shift cam 12 in the circumferential direction are determined at predetermined positions respectively. The position P of the shift cam plate 27 with respect to the shift cam 12 in the circumferential direction is determined when the small-diameter portion 14 of the shift cam 12 is press-fitted into the circular recessed portion 33 of the shift cam plate 27 during the manufacture of the shift device 11. The position Q of the transmission shaft 39 with respect to the shift cam 12 in the circumferential direction is determined when the transmission shaft 39 is press-fitted into the insertion hole 16 of the shift cam 12 during the manufacture of the shift device 11.

The drive plate 43 is a member that transmits rotation of the shift pedal shaft 61 to the shift cam plate 27. In FIG. 4, a rear side portion of the drive plate 43 is non-rotatably fixed to the shift pedal shaft 61. Specifically, a connection hole 44 is formed in the rear side portion of the drive plate 43. The shift pedal shaft 61 is inserted into the connection hole 44, and the drive plate 43 is non-rotatably coupled to the shift pedal shaft 61 by, for example, a spline. Accordingly, the drive plate 43 oscillates with the axial center E as an oscillation axis, by the rotation of the shift pedal shaft 61.

The insertion hole 45 is formed in a front side portion of the drive plate 43. The transmission shaft 39 is inserted into the insertion hole 45. The transmission shaft 39 has a function of limiting an oscillation range of the drive plate 43 in addition to a function of transmitting the rotation of the shift cam 12 to the shift cam sensor 48. The oscillation of the drive plate 43 is limited to a range in which an inner circumferential surface of the insertion hole 45 of the drive plate 43 is in contact with an outer circumferential surface of the intermediate portion of the transmission shaft 39 in the left-right direction.

Figure 8:
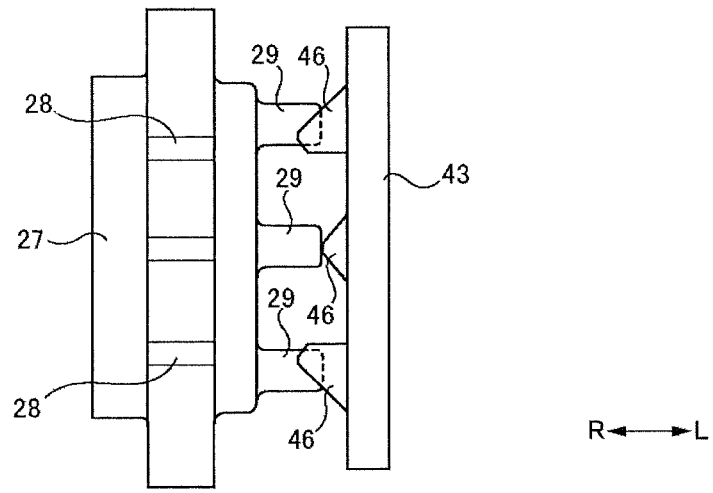
FIG. 8 is an explanatory view showing the shift cam plate and the drive plate in the shift device according to the embodiment of the present invention.

The plurality of pawl portions 46 that transmit the oscillation of the drive plate 43 to the shift cam plate 27 are formed at a front end portion on a right surface of the drive plate 43. Here, FIG. 8 schematically shows the drive plate 43 and the shift cam plate 27 viewed from a direction of an arrow VIII in FIG. 6. From this drawing, an engagement structure of the pawl portion 46 of the drive plate 43 and the protrusion 29 of the shift cam plate 27 can be obtained. When the pawl portion 46 moves due to the oscillation of the drive plate 43, the protrusion 29 is pressed by the pawl portion 46, and the shift cam plate 27 and the shift cam 12 rotate at a predetermined angle (for example, 60 degrees).

As shown in FIG. 4, a right end portion of the shift pedal shaft 61 is rotatably supported by a support portion 62, formed on the crankcase 2, via a bearing 63. A left end side of the shift pedal shaft 61 penetrates a shift pedal shaft insertion hole 54 formed in a rear portion of the side cover 52. A bearing 65 and an oil seal 66 are provided inside the shift pedal shaft insertion hole 54, and the left end side of the shift pedal shaft 61 is rotatably supported by the side cover 52 via the bearing 65. The shift pedal for the driver to perform shift operation with a left foot is attached to a left end portion of the shift pedal shaft 61. The shift pedal shaft 61 is urged by a spring 64, and accordingly the shift pedal shaft 61 returns to an initial position after the shift operation.

The shift cam sensor 48 is a sensor that detects a rotation angle of the shift cam 12, and is, for example, a potentiometer. As shown in FIG. 3, the shift cam plate 27, the stopper arm 35, the transmission shaft 39, the shift pedal shaft 61, and the like are disposed on a lower portion on a rear left side of the crankcase 2. As shown in FIG. 2, the side cover 52 is attached to the lower portion on the rear left side of the crankcase 2, and the shift cam plate 27 and the stopper arm 35 are covered by the side cover 52. As shown in FIG. 4, a transmission shaft insertion hole 53 is formed in a front portion of the side cover 52, and the transmission shaft 39 is inserted into the transmission shaft insertion hole 53. Further, the shift cam sensor 48 is attached to an opening on a left side of the transmission shaft insertion hole 53 so as to block the opening. Accordingly, the shift cam sensor 48 is disposed outside the crankcase 2 and the side cover 52.

Figure 9:
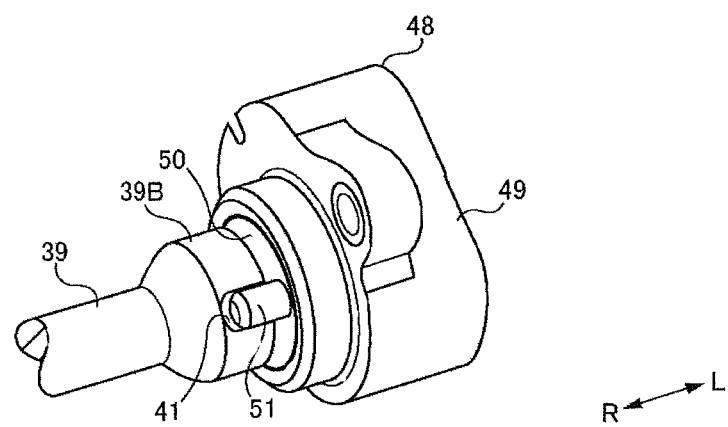
FIG. 9 is an explanatory view showing the transmission shaft and the shift cam sensor in the shift device according to the embodiment of the present invention.

Here, FIG. 9 shows the shift cam sensor 48 and the left end portion 39B of the transmission shaft 39. As shown in FIG. 9, the shift cam sensor 48 includes a casing 49, a rotor 50 rotatably supported by the casing 49, a detection circuit provided in the casing 49, and the like. The engagement projection piece 51 is provided on the rotor 50, and the engagement projection piece 51 is engaged with the engagement groove 41 formed in the left end portion 39B of the transmission shaft 39. Accordingly, the transmission shaft 39 and the shift cam sensor 48 are connected to each other. The rotor 50 of the shift cam sensor 48 rotates by the rotation of the transmission shaft 39. The shift cam sensor 48 outputs an electrical signal corresponding to a rotation angle of the rotor 50 as an electrical signal indicating the rotation angle of the shift cam 12 to, for example, a control unit of a motorcycle.

Figure 10:
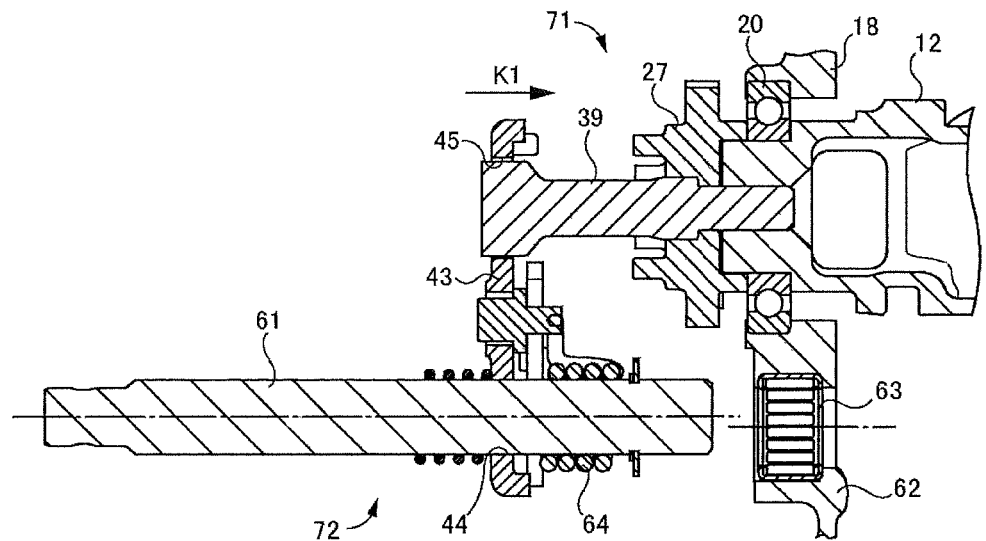
FIG. 10 is an explanatory view showing assembly of a shift pedal shaft in the embodiment of the present invention.
Figure 10:
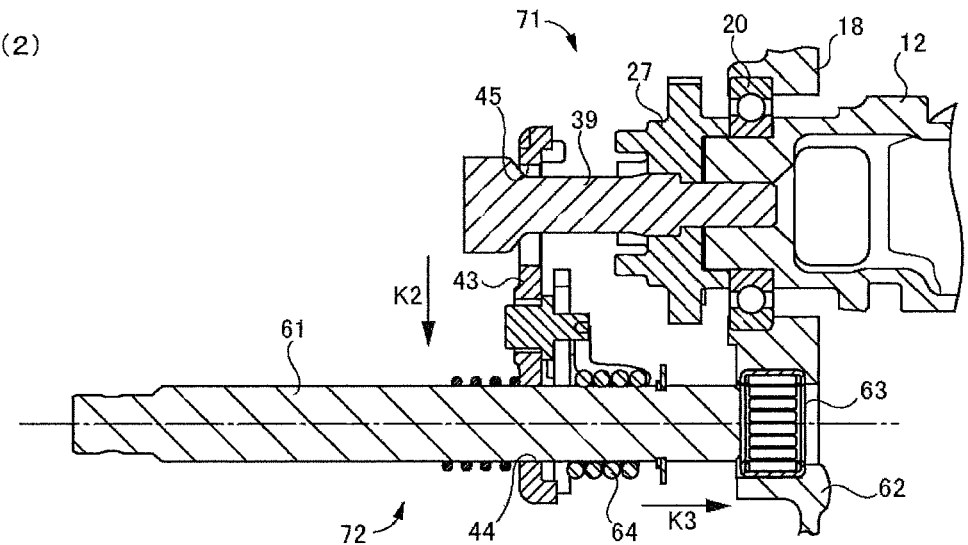
Figure 10:
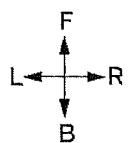

FIG. 10 shows assembly of the shift pedal shaft 61 to the crankcase 2. During manufacture of a motorcycle, the assembly of the shift pedal shaft 61 to the crankcase 2 is performed, for example, in the following procedures. First, a first unit 71 is formed by assembling the left bearing 20, the shift cam plate 27, and the transmission shaft 39 to the shift cam 12, and a second unit 72 is formed by assembling the drive plate 43 and the like to the shift pedal shaft 61. Next, the first unit 71 is assembled to the crankcase 2. Next, the second unit 72 is assembled to the crankcase 2.

When assembling the second unit 72 to the crankcase 2, first, the left end portion 39B of the transmission shaft 39 included in the first unit 71 is inserted into the insertion hole 45 of the drive plate 43 included in the second unit 72. Next, the second unit 72 is moved rightwards as indicated by an arrow K1 in (1) of FIG. 10 until the insertion hole 45 of the drive plate 43 reaches a small diameter portion of the intermediate portion of the transmission shaft 39 in the left-right direction. Next, the second unit 72 is moved rearwards as indicated by an arrow K2 in (2) of FIG. 10, so as to align the axial center of the shift pedal shaft 61 with an axial center of the bearing 63 attached to the support portion 62 of the crankcase 2. Next, the second unit 72 is moved rightwards as indicated by an arrow K3 in (2) of FIG. 10, so as to insert the right end portion of the shift pedal shaft 61 into the bearing 63.

Since the intermediate portion of the transmission shaft 39 in the left-right direction is smaller in diameter than the left end portion 39B of the transmission shaft 39, the second unit 72 can be moved rearwards after the transmission shaft 39 is inserted into the insertion hole 45 of the drive plate 43, and thus the shift pedal shaft 61 can be inserted into the bearing 63. Therefore, during the manufacture of the motorcycle, for example, the first unit 71 and the second unit 72 are formed separately in advance, and then the first unit 71 and the second unit 72 can be assembled separately to the crankcase 2 in an assembly line of the motorcycle. Therefore, assembly operation of the motorcycle can be simplified.

As described above, according to the shift device 11 of the embodiment of the present invention, by press-fitting the right end portion 39A of the transmission shaft 39 into the insertion hole 16 formed in the left end surface of the shift cam 12, the position of the transmission shaft 39 with respect to the shift cam 12 in the circumferential direction can be determined with high accuracy, and the transmission shaft 39 can be firmly fixed to the shift cam 12 such that the position of the transmission shaft 39 does not displace with respect to the shift cam 12 in the circumferential direction. Therefore, the detection accuracy of the rotation angle of the shift cam 12 by the shift cam sensor 48 can be improved.

Further, since a pin or a key is not used for positioning the transmission shaft 39 with respect to the shift cam 12 in the circumferential direction, it is possible to eliminate position variation or displacement of the transmission shaft 39 with respect to the shift cam 12 due to a tolerance of a hole or a groove into which the pin or the key is inserted. Further, since the pin or the key is not used, the number of parts of the shift device 11 can be reduced.

During the manufacture of the shift device 11, as shown in FIG. 7, the position P of the shift cam plate 27 with respect to the shift cam 12 in the circumferential direction is determined, and the small-diameter portion 14 of the shift cam 12 is press-fitted into the circular recessed portion 33 of the shift cam plate 27. Then, the position Q of the transmission shaft 39 with respect to the shift cam 12 in the circumferential direction can be easily determined with the position P of the shift cam plate 27 as a reference when press-fitting the right end portion 39A of the transmission shaft 39 into the insertion hole 16 of the shift cam 12.

In the shift device 11 of the embodiment of the present invention, the left end portion (small-diameter portion 14) of the shift cam 12 is press-fitted into the circular recessed portion 33 of the shift cam plate 27, and the right end portion 39A of the transmission shaft 39 is press-fitted into the insertion hole 16 formed in the center of the left end surface of the shift cam 12. Therefore, an outer circumferential side portion of the left end portion of the shift cam 12, that is, a portion between the outer circumferential surface of the left end portion of the shift cam 12 and the inner circumferential surface of the insertion hole 16, is pressed outwards in the radial direction by the right end portion 39A of the transmission shaft 39 and is pressed inwards in the radial direction by the right end portion (an outer edge portion of the circular recessed portion 33) of the shift cam plate 27. Due to two pressing forces which are reverse to each other in the radial direction and act on the outer circumferential side portion of the left end portion of the shift cam 12, a fixing force between the right end portion 39A of the transmission shaft 39 and the shift cam 12 can be increased, and a fixing force between the right end portion of the shift cam plate 27 and the shift cam 12 can be increased.

Further, according to the shift device 11 of the embodiment of the present invention, the inner ring of the left bearing 20 can be firmly fixed between the right end surface 27A of the shift cam plate 27, into which the small-diameter portion 14 of the shift cam 12 is press-fitted, and the step portion 15, which is formed on the left end portion of the shift cam 12.

According to the shift device 11 of the embodiment of the present invention, the step portion 31 of the transmission shaft 39 press-fitted into the insertion hole 16 of the shift cam 12 and the step portion 40 formed on the through hole 30 of the shift cam plate 27 are in contact with each other. Accordingly, the shift cam plate 27 can be pressed rightwards by the transmission shaft 39 press-fitted into the insertion hole 16 of the shift cam 12, and thus the fixing force of the shift cam plate 27 to the shift cam 12 can be increased.

In the shift device 11 of the embodiment of the present invention, the tip end of the right end portion 39A of the transmission shaft 39 press-fitted into the insertion hole 16 of the shift cam 12 enters inside the left bearing 20. Accordingly, as described above, the inner circumferential surface of the inner ring of the left bearing 20 can be reliably brought into contact with the outer circumferential surface of the left end portion of the shift cam 12.

Further, according to the shift device of the embodiment of the present invention, since the shift cam sensor 48 is disposed outside the crankcase 2, the temperature around the shift cam sensor 48 can be lowered compared with a case where the shift cam sensor 48 is disposed inside the crankcase 2. Accordingly, an angle sensor having a low heat-resistant temperature can be used as the shift cam sensor 48, such as a contactless angle sensor including an electronic substrate therein.

In the above-described embodiment, although a case where the shift device 11 is applied to a six-stage transmission is exemplified, the number of stages of the transmission is not limited. In the above-described embodiment, although the shift device 11 in the transmission of the engine 1 used in the motorcycle is exemplified, the shift device of the present invention can also be applied to a transmission of an engine used in other types of vehicles.

The present invention can be modified as appropriate within a scope not departing from the spirit or idea of the invention that can be read from the scope of claims and the entire specification, and a shift device with such a modification is also included in the technical idea of the present invention.

What is claimed is:

1. A shift device of a transmission, comprising:
a cylindrical or columnar shift cam that is formed, at an outer circumferential surface of the shift cam, with a cam groove for operating a shift fork;
a drive plate that oscillates by rotation of a shift pedal shaft;
a shift cam plate that is fixed to one end portion of the shift cam and rotates the shift cam according to the oscillation of the drive plate;
a shift cam sensor that detects a rotation angle of the shift cam; and
a transmission shaft that transmits the rotation of the shift cam to the shift cam sensor, wherein
an insertion hole is provided in a position corresponding to a rotation axis of the shift cam at the one end portion of the shift cam,
a through hole penetrating the shift cam plate is provided in the shift cam plate,
the transmission shaft is disposed coaxially with the shift cam, one end portion of the transmission shaft is connected to or opposed to the shift cam sensor, and an other end portion of the transmission shaft penetrates the through hole and is fixed to the shift cam in a state of being press-fitted into the insertion hole,
a diameter of the transmission shaft is larger at the one end portion of the transmission shaft than at the other end portion of the transmission shaft and than at an intermediate portion, connecting the one end portion and the other end portion, of the transmission shaft; and a part of the one end portion shaft of the transmission shaft is overlapped with the drive plate as viewed in an axial direction of the transmission shaft, and
the one end portion of the transmission shaft is provided with an engagement groove that is engaged with an engagement projection piece of the shift cam sensor, and the engagement groove is provided at a portion on an outer circumferential surface of the one end portion of the transmission shaft from an outer edge of an end face of the one end portion of the transmission shaft.

2. The shift device according to claim 1, wherein a recessed portion is provided at an other end portion of the shift cam plate, and the shift cam plate and the shift cam are fixed to each other in a state where the one end portion of the shift cam is press-fitted into the recessed portion.

3. The shift device according to claim 2, wherein a bearing for rotatably supporting the one end portion of the shift cam on a support portion of the shift cam is provided at the one end portion on an outer circumferential side of the shift cam at an other side than the shift cam plate in an axial direction of the shift cam, and the other end portion of the transmission shaft located in the insertion hole extends to the other side in the axial direction of the shift cam to reach a position inside the bearing.

* * * * *